Sept. 30, 1947.  L. FREINKEL  2,428,019
SYNCHRONOUS MOTOR CONTROL SYSTEM
Filed Oct. 12, 1945
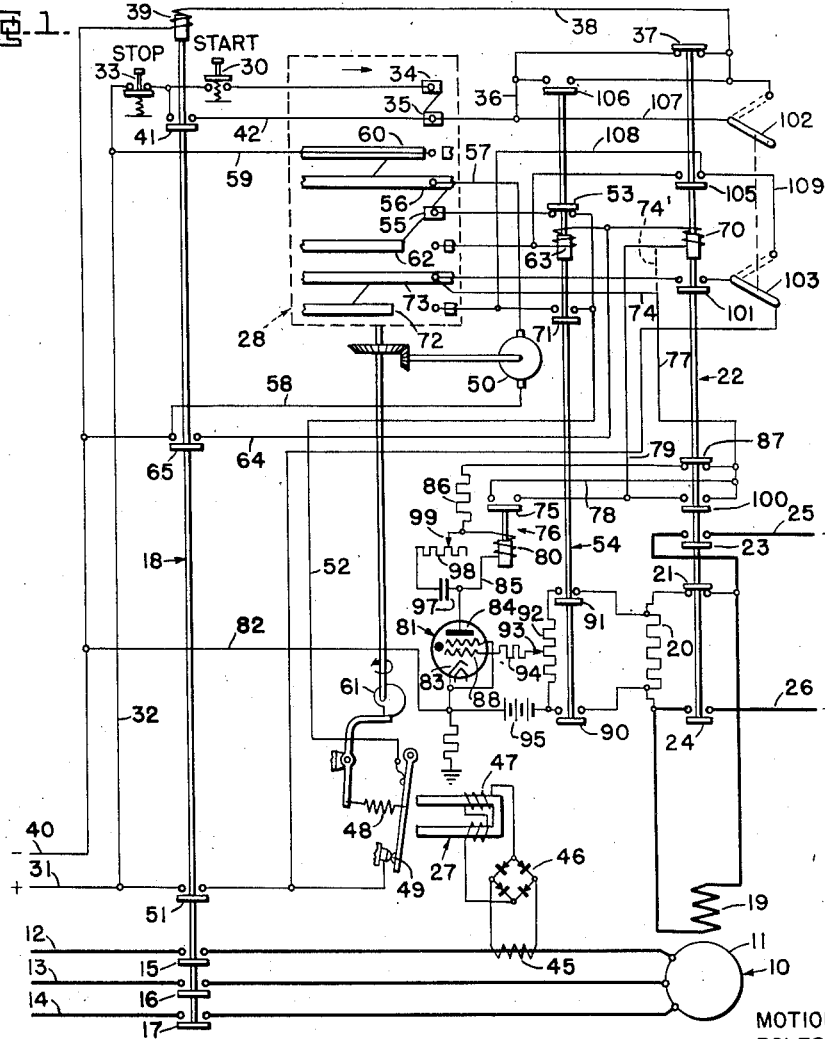
Fig. 1.
Fig. 2.
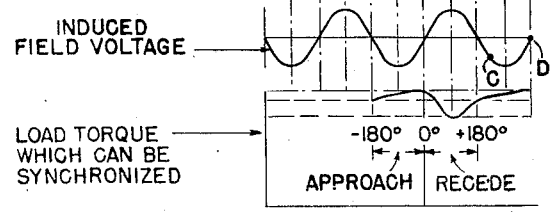
*INVENTOR.*
Leonard Freinkel
BY
ATTORNEY.

Patented Sept. 30, 1947

2,428,019

UNITED STATES PATENT OFFICE 2,428,019

SYNCHRONOUS MOTOR CONTROL SYSTEM

Leonard Freinkel, Washington, D. C.

Application October 12, 1945, Serial No. 622,110

4 Claims. (Cl. 172—289)

(Granted under the act of March 3, 1883, as amended April 30, 1928; 370 O. G. 757)

This invention relates to improvements in synchronous motor control systems and more particularly to a system for controlling the application of direct current excitation to a synchronous motor field winding.

It is generally known that a conventional synchronous motor can develop sufficient torque to pull its load into step, with a minimum line disturbance, only when the field excitation is applied at the right part of the slip cycle of induced field current. Inasmuch as conventional field switching means are not instantaneous in action, due allowance must be made not only for the time constant of the field circuit but also for the pick-up time of the field switching means. Hence, the operation of the field switching means must be initiated a certain time in advance, in order that the field excitation will be applied at the correct instant.

An important object of the invention is to provide an improved system for connecting a synchronous motor field winding to a source of direct current excitation at the proper instant so that the motor will develop its maximum pull-in torque and so that line disturbances will be minimized during the pull-in period.

Another object of the invention is to provide an improved system for connecting a synchronous motor field winding to a source of excitation so that the most favorable point for applying said excitation is always selected.

A further object of the invention is the provision of improved means for applying excitation to the field winding of a synchronous motor at the correct time and which is simple, precise in operation, and easily adjusted for application to any synchronous motor.

Other objects and advantages of the invention will become apparent during the course of the following detailed description, taken in connection with the accompanying drawing, forming a part of this specification, and in which drawing, Figure 1 is a diagrammatic view of my control system applied to a conventional synchronous motor, and Figure 2 is a view showing a set of curves illustrating certain characteristics of the invention and their relationship to the positions of the stator and rotor poles of the motor.

In the drawing, which for the purpose of illustration shows only a preferred embodiment of the invention, the numeral 10 generally designates a conventional synchronous motor having an armature 11 energized with alternating current from buses 12, 13, 14, upon closing of contact members 15, 16, 17, forming part of the main switch 18. The field winding 19 of the motor 10 is serially connected to a field discharge resistor 20 by an initially closed contact member 21 forming part of the field switch 22. When contact members 23, 24, of the field switch 22 are closed, the field winding 19 is excited by direct current from the buses 25, 26, and the field discharge resistor 20 is disconnected from the field winding at the contact member 21.

The system includes a current-actuating element 27 responsive to motor speed, and a time element 28 which is a motor-driven, drum-type switch. These elements are well known in the art of synchronous motor control as evidenced by U. S. Patent 2,310,139 granted to W. R. Wickerham, and therefore are not described in detail herein.

The starting circuit is energized by direct current, upon depressing the starting pushbutton 30, via positive supply line 31, conductor 32, normally closed stop pushbutton 33, the starting pushbutton 30, drum contacts 34, 35, conductor 36, a normally closed contact member 37 forming part of the field switch 22, conductor 38, actuating coil 39 of the main switch 18, and the negative supply line 40. Energization of the coil 39 actuates the main switch 18, thereby closing contact members 15, 16, 17 to start the motor as an induction motor. At the same time, a contact member 41 forming part of the main switch 18 is closed thus establishing a holding circuit including a conductor 42 shunting the starting pushbutton 30.

Upon starting, the initially heavy current drawn by the motor 10 energizes the current-actuated element 27 via the current transformer 45 and full-wave rectifier 46. The magnetic pull of the coil 47 of the current-actuated element overcomes the restraining action of the spring 48 and therefore the contact 49 opens.

After the initial inrush, the current drawn by the motor drops off gradually until about 75% speed is attained after which it drops off more rapidly. The magnetic pull of the coil decreases in proportion and at approximately 90% speed it has dropped sufficiently to allow the tension of the springs 48 to overcome it, thus closing contact 49. The pilot motor 50 of the time element 28 is thereupon energized by direct current via the positive supply line 31, normally open but now closed contact member 51 of the main switch 18, contact 49 of the current element, conductor 52, normally closed contact member 53 forming part of a control switch 54, drum contacts 55, 56, conductor 57, the pilot motor 50, conductor 58, and the negative supply line 40. Shortly after the motor-driven, drum-type switch begins to make one complete revolution in the direction of the arrow shown in Figure 1, a circuit for energizing the pilot motor 50 independent of the current element contact 49 is established, via the positive supply line 31, conductor 32, conductor 59, drum contacts 60, 56, conductor 57, motor 50, conductor 58 and the negative supply line 40.

After approximately 30° rotation of the drum-type switch 28, a recalibrating cam 61 forming part of the current element 27 but driven by the pilot motor 50 of the time element 27, operates to abruptly reduce the tension on spring 48 so that its pull can be overcome by the existing magnetic pull of the current element 27. The contact 49 of the current element is thus opened for the second time. Shortly thereafter, the drum contact 62 closes, thereby establishing a circuit energizing the actuating coil 63 of the control switch 54, via the positive supply line 31, conductors 32, 59, drum contacts 60, 56, 55, 62, actuating coil 63, conductor 64, normally open but now closed contact member 65 forming part of the main switch 18, and the negative supply line 40.

The contact 49 of the current element 27 will reclose when the tension of the spring 48, gradually increasing due to the action of the recalibrating cam 61, is sufficient to overcome the very gradually decreasing magnetic pull of the current element coil 47.

When the motor 10 has accelerated to about 95% to 98% of synchronous speed, the magnetic pull of the coil 47 varies in accordance with the envelope 66 of the stator current wave, as shown in Figure 2. The envelope arises due to the changes in reluctance as the virtual poles of the stator flux slip past the rotor poles; that is, there is a decrease in stator current each time a stator "pole" is opposite a rotor pole. It is evident that, as the tension of the spring 48 is slowly increasing and the magnetic pull of the coil is following the envelope of the stator current, remembering that the coil 47 is energized by rectified current, there will arrive a time, at one of the low points of the stator current envelope when the spring 48 will overcome the magnetic pull of the coil 47 and close the contact 49.

In a prior synchronous motor control system, this reclosing of the current element contact 49 caused energization of the field switch actuating coil 70 via the positive supply line 31, contact 49, conductor 52, normally open but now closed contact member 71 forming part of the control switch 54, drum contacts 72, 73, conductors 74, 74', actuating coil 70, conductor 64, contact member 65, and the negative supply line 40.

Referring again to Figure 2, and bearing in mind the foregoing method of reclosure of contact 49, it is seen that only by very careful initial setting of the spring 48 and exactly repeated timing cycles can closure be achieved at the low point A of the stator current envelope 66 in the approach region. Experience has shown that closure at the low point B of the stator current envelope 66 in the recession angle can just as likely occur, probably due to very minute changes in the timing cycle or value of stator current, especially on high inertia loads. Furthermore, the field is actually energized at some later point in the stator current envelope because of the previously mentioned pickup time of the field switch, and the lag due to the time constant of the field. Unless the pickup time and lag are exactly correct for the given conditions, excitation cannot occur at the most favorable point. It is this last operation of the field application system which I improve by means of my invention.

My invention insures that energization of the field switch can definitely be initiated in the approach region and allows compensation to be made for pickup time of the field switch and lag due to the time constant of the field. By virtue of this compensation, it permits adjustment so that excitation may be applied at precisely the correct moment.

Referring to Figure 1, it is seen that the normally open contact member 75 of an auxiliary control relay 76, and its associated circuit including conductors 77, 78, 79, are interposed between the drum switch contact 73 and the field switch actuating coil 70, replacing the conductor 74' shown in broken lines. The actuating coil 80 of this auxiliary control relay is disposed in the plate circuit of a gaseous discharge tube 81 and is energized only when the tube conducts. The plate circuit of the tube includes a conductor 82 extending from the negative supply line 40 to the cathode 83, the anode 84, conductor 85, the actuating coil 80, resistor 86, normally closed contact member 87 forming part of the field switch 22, conductor 77, drum switch contacts 73, 72, contact member 71, conductor 52, current element switch contact 49, contact member 51 and the positive supply line 31.

The tube 81 is controlled by means of voltage applied to its control grid 88 and will conduct whenever this voltage is of correct polarity and of sufficient magnitude to overcome the bias imposed upon the control grid.

Referring again to Figure 2, it is seen that the induced field voltage is negative, with respect to the normal excitation voltage on the field, in the approach region and positive in the recession region. Furthermore, this voltage is maximum, either negative or positive, for positions midway between rotor poles and passes through zero when the rotor poles are opposite the stator poles. Use is made of these facts in controlling the tube 81.

Connected across the field discharge resistor 20, through contact members 90, 91 forming part of the control switch 54, is a potentiometer 92 having its movable contact 93 connected as by resistor 94 to the control grid 88 of the tube. This control grid is biased negatively with respect to the cathode 83 as by connecting a battery 95 between the cathode and one end of the potentiometer 92. Thus, the control grid is biased negatively to a value which is a little less than that which obtains in the field windings before synchronization; that is, less than the value which exists at approximately 95% to 98% of synchronous speed. The control voltage superimposed on this bias is the induced field voltage.

Assuming that the potentiometer 92 is so connected across the field discharge resistor 20 as to make the upper end of the potentiometer positive when the induced field voltage is negative, it is readily seen that, by moving the potentiometer contact 93 toward the upper end, the control grid 88 will become increasingly positive. Inasmuch as the maximum amplitude of the induced field voltage is greater than the bias on the control grid of the tube, a setting on the control potentiometer will finally be reached which is sufficient to allow the grid to be driven to its firing point. As the bias voltage is a little less than the peak value of the induced field voltage, the firing point C occurs fairly close to the peak of the negative induced field voltage. Therefore, the current element contact 49 may reclose at any one of the low points A, B, of the stator current envelope, but the tube 81 will fire only at some point C in an approach region. Breakdown of the tube will energize the relay 76 and thus effect energization of the actuating coil 70 of the field switch 22.

The pickup time of the auxiliary control relay 76 is adjusted by means of an associated circuit including a capacitance 97 and rheostat 98 serially connected to the relay actuating coil 80. By shifting the rheostat contact 99, the pickup time of the relay can be adjusted to compensate for the pickup time of the field switch and the lag of the motor field so that excitation will be fully applied at a point D which is the optimum point for synchronization.

It is obvious that the positive half of the cycle of induced field voltage could just as readily have been chosen and, by proper circuit constants in the tube circuit, excitation could likewise have been applied at point D. Closure of the field switch removes all voltages from tube 81 by opening contact members 21, 87, the field switch having sealed itself in via contact members 65, 100, 101, 51, provided the recycling switches 102, 103 are in the shut-down position, as shown by solid lines in Figure 1.

If heavy torque causes a pull-out while the switches 102, 103, are in the shut-down position as shown, a surge of current will strengthen the magnetic pull of the current element 27, opening contact 49, deenergizing the circuit which includes the positive supply line 31, contact 51, current element contact 49, conductor 52, contact 71, conductor 108, contact 105, coil 63, conductor 64, contact 65 and the negative supply line 40. Upon deenergization of the actuating coil 63, contact 106 opens, deenergizing the main switch actuating coil 39, thus causing a shut-down.

In the event of a pull-out with the switches 102, 103 in the recycling position shown in broken lines, the current element contact 49 again opens and coil 63 is deenergized as before described, but the main switch 18 is not opened because a shunting link 107 is provided around contact 106, via switch 102. Inasmuch as contact 71 is opened, the circuit including positive line 31, contact 51, current element contact 49, contact 71, conductors 108, 109, switch arm 103 in the dotted line position, contact 101, drum switch contact 73, conductor 77, contact 106, conductor 79, field switch actuating coil 70, conductor 64, main switch contact 65, and negative line 40, is deenergized, thus opening the field switch 22 and removing the field excitation. Thus all the circuit elements have been returned to their positions prior to the synchronizing operation in readiness for automatic recycling.

Various changes may be made in the form of invention herein shown and described without departing from the spirit of the invention or the scope of the following claims.

The invention described herein may be manufactured and used by or for the Government of the United States of America for governmental purposes without the payment of any royalties thereon or therefor.

I claim:

1. A starting system for a conventional synchronous motor having a field winding, an initially closed field discharge circuit therefor, a field excitation circuit, switch means operable to open said field discharge circuit and to connect said excitation circuit to the field winding, control means including an electric discharge device for operating said switch means when said discharge device conducts, said discharge device having a control electrode, means operatively connecting said control electrode to the field discharge circuit so that said discharge device is adapted to conduct when the induced field voltage reaches a predetermined value, and means initiating operation of said control means after the motor has reached a predetermined subsynchronous speed.

2. A starting system for a conventional synchronous motor having a field winding, an initially closed field discharge circuit therefor, a field excitation circuit, switch means operable to open said field discharge circuit and to connect said excitation circuit to the field winding, control means including an electric discharge device having an anode, a cathode and a control electrode, and adapted to operate said switch means when a discharge is produced in said device, means impressing a voltage on the control electrode of a magnitude which is a function of the induced field voltage, said discharge device being adapted to conduct when the induced field voltage reaches a predetermined value, and means initiating operation of said control means after the motor has reached a predetermined subsynchronous speed.

3. A starting system for a conventional synchronous motor having a field winding, an initially closed field discharge circuit therefor, a field excitation circuit, relay means operable upon energization to open said field discharge circuit and to connect said excitation circuit to the field winding, a circuit for energizing said relay means including two serially connected normally open switches, means for closing one of said switches after the motor during induction motor operation reaches a predetermined subsynchronous speed, and means including a control circuit responsive solely to voltage induced in the field discharge circuit for thereafter closing the other of said switches when the voltage induced in the field discharge circuit after closure of said one switch next reaches a predetermined value, and means for adjusting the time constant of said control circuit.

4. In a starting system for a conventional synchronous motor having an armature winding and a field winding, a source of alternating current, switch means for connecting the armature winding to the source of alternating current to start operation of the motor as an induction motor, an initially closed field discharge circuit for the field winding, a field excitation circuit, field switching means operable to open said field discharge circuit and to connect said excitation circuit to the field winding, a relay, an actuating coil for the relay, said actuating coil being so connected to the armature winding of the motor as to be responsive to the envelope current of the motor armature, calibrating means, set in operation by a drop-out of said relay at a predetermined drop in envelope armature current, adapted to increase the sensitiveness of said relay so that it becomes responsive to the frequency of the envelope current whereby said relay is caused to again pick up and then drop out at a low current point of a low frequency of the envelope current, and control means operable upon the occurrence of said last-mentioned drop-out of the relay for controlling the instant of operation of the field switching means, said control means including an electric discharge device having a control electrode so connected to the field discharge circuit that said discharge device conducts when the induced field voltage, after said last-mentioned drop-out, next reaches a predetermined value.

LEONARD FREINKEL.

REFERENCES CITED

The following references are of record in the file of this patent:

UNITED STATES PATENTS

| Number | Name | Date |
| --- | --- | --- |
| 2,108,038 | Balmford | Feb. 15, 1938 |
| 2,205,248 | Edgerton | June 18, 1940 |
| 2,338,557 | Wickerham | Jan. 4, 1944 |
| 2,397,116 | Armstrong | Mar. 26, 1946 |